US007166345B2

(12) United States Patent

Myers et al.

(10) Patent No.: US 7,166,345 B2
(45) Date of Patent: Jan. 23, 2007

(54) DESTRUCTIBLE PRIVACY LABEL

(75) Inventors: Zane D. Myers, Woodinville, WA (US); Donald J. Propp, Dewitt, MI (US)

(73) Assignee: Tri-State Hospital Supply Corporation, Howell, MI (US)

( * ) Notice: Subject to any disclaimer, the term of this patent is extended or adjusted under 35 U.S.C. 154(b) by 176 days.

(21) Appl. No.: 10/795,909

(22) Filed: Mar. 8, 2004

(65) Prior Publication Data

US 2005/0196573 A1 Sep. 8, 2005

(51) Int. Cl.
*B32B 3/14* (2006.01)
*B42D 15/00* (2006.01)

(52) U.S. Cl. ...................... 428/42.3; 40/299.1; 40/324; 283/81; 283/900; 428/40.1; 428/41.3; 428/41.7; 428/41.9; 428/42.1; 428/42.2; 428/43; 428/192; 428/915; 428/916

(58) Field of Classification Search ............... 428/40.1, 428/41.3, 41.7, 42.1, 42.2, 42.3, 43, 192, 428/41.9, 915, 916; 40/299.1, 324; 283/81, 283/900
See application file for complete search history.

(56) References Cited

U.S. PATENT DOCUMENTS

| | | | | |
|---|---|---|---|---|
| 4,309,468 | A * | 1/1982 | St. Aubin | 428/42.3 |
| 5,893,587 | A * | 4/1999 | Wong | 283/98 |
| 5,895,075 | A | 4/1999 | Edwards | |
| 6,635,326 | B1 * | 10/2003 | Ueki et al. | 428/40.1 |

* cited by examiner

*Primary Examiner*—Nasser Ahmad
(74) *Attorney, Agent, or Firm*—Fildes & Outland, P.C.

(57) ABSTRACT

A destructible privacy label includes a sheet-like member having an upper surface and an adhesive lower surface. The upper surface is adapted for printing indicia thereon. The sheet-like member includes two segments conjoined about a separation line which defines adjacent segment edges. Each segment is separable from the other along the separation line. Removing one of the segments from the other renders indicia printed on the sheet-like member upper surface illegible.

8 Claims, 6 Drawing Sheets

DESTRUCTIBLE PRIVACY LABEL

TECHNICAL FIELD

This invention relates to labels used in connection with patient care with medical objects such as medical records, medical containers, and medical devices and, more particularly, to privacy labels that are easily destructible to insure patient privacy after use.

BACKGROUND OF THE INVENTION

Health care providers commonly label medical objects such as charts, medical devices, and medication containers associated with a particular patient to ensure that the patient receives their intended medical care. However, the Health Insurance Portability and Accountability Act (HIPAA) requires health care providers to hide a patient's identity before disposing of any medical objects associated with the patient.

Patient identification is commonly accomplished by attaching a one-piece label having an adhesive lower surface adapted to adhere to a medical object and an upper surface for displaying indicia such as a patient's name, social security number, or a barcode. At the conclusion of a medical treatment, i.e. when a labeled medical container such as an intravenous (IV) bag is emptied, the label must be adequately destroyed to make the indicia printed thereon illegible. This requires a health care provider to tear away or adequately cross out the indicia printed on the label to protect a patient's identity before disposing of the medical object.

SUMMARY OF THE INVENTION

The present invention provides a destructible privacy label for use with patient labeled medical objects such as medical records, medication containers, and medical supplies. The destructible privacy label is easily destroyable prior to disposal of the associated object thus rendering patient identifying indicia on the label illegible. The destructible privacy label aids a health care provider by allowing the provider to easily destroy the indicia displayed on the sheet-like member by removing one of the segments.

A destructible privacy label in accordance with the present invention includes a sheet-like member having an upper surface and an adhesive lower surface. The upper surface is adapted for printing indicia thereon. The sheet-like member includes two segments conjoined about a separation line that defines adjacent segment edges and the separation line has a curvilinear shape. Each segment is separable from the other along the separation line. Removing one of the segments of the sheet-like member from the other renders indicia printed on the sheet-like member upper surface illegible.

In a preferred embodiment, the separation line may be sinusoidal and extends from one edge of the sheet-like member to another edge of the sheet-like member. The separation line may also be a cut line.

Optionally, the destructible privacy label may include a removable release liner contacting the sheet-like member adhesive lower surface. This preserves the adhesive on the sheet-like member prior to use of the label. The surface of the release liner contacting the sheet-like member adhesive lower surface may be siliconized. One segment of the sheet-like member may also have a permanent adhesive on the adhesive lower surface. Alternatively, the destructible privacy label may further include a second sheet-like member having an upper surface and an adhesive lower surface, wherein the upper surface releasably contacts the first sheet-like member adhesive lower surface. The upper surface of the second sheet-like member may be siliconized and a removable release liner may contact the second sheet-like member adhesive lower surface. The surface of the release liner contacting the second sheet-like member adhesive lower surface may also be siliconized. The second sheet-like member provides a mounting surface between the first sheet-like member and an associated medical object so that one of the segments may be easily removed to destroy the first sheet-like member to render indicia printed thereon illegible.

In an alternative embodiment, a destructible privacy label includes a sheet-like member having an upper surface and an adhesive lower surface. The upper surface is adapted for printing indicia thereon. The sheet-like member includes a plurality of remainder segments and at least one removable segment that is separable from the remainder segments. Removing the removable segment from the remainder segments renders indicia printed on the sheet-like member upper surface illegible.

Optionally, at least one of the remainder segments may have a two-dimensional shape chosen from a group of circles, squares, diamonds, octagons, dagger shapes, saw tooth shapes, and island shapes. At least one remainder segment of the sheet-like member may also have a permanent adhesive on the adhesive lower surface. Alternatively, the destructible privacy label may further include a second sheet-like member having an upper surface and an adhesive lower surface, wherein the upper surface releasably contacts the first sheet-like member adhesive lower surface. A removable release liner may contact the second sheet-like member adhesive lower surface.

A method of protecting the privacy of a patient's identity and personal information in a healthcare setting includes the step of providing a destructible privacy label including a sheet-like member having an upper surface and an adhesive lower surface. The upper surface is adapted for printing indicia thereon. The sheet-like member includes two segments conjoined about a separation line which defines adjacent segment edges and has a curvilinear shape. Each segment is separable from the other along the separation line.

In a preferred embodiment, the step of providing a destructible label may include providing a destructible label further including a removable release liner contacting the sheet-like member adhesive lower surface. The method may also include the steps of: printing indicia on the sheet-like member upper surface, the indicia being operative to indicate a patient's identity and personal information; removing the release liner from the sheet-like member adhesive lower surface; placing the adhesive lower surface of the sheet-like member on an object to associate the object with the patient's identity and personal information; and removing one of the sheet-like member segments from the object, thereby rendering the indicia printed on the sheet-like member upper surface illegible.

In an alternative embodiment, the step of providing a destructible label may include providing a destructible label further including a second sheet-like member having an upper surface and an adhesive lower surface, the upper surface releasably contacting the first sheet-like member adhesive lower surface, and a removable release liner contacting said second sheet-like member adhesive lower surface. The method may then also include the steps of: printing indicia on the first sheet-like member upper surface, the indicia operative to indicate a patient's identity and personal information; removing the release liner from the second sheet-like member adhesive lower surface; placing the adhesive lower surface of the second sheet-like member on an object to associate the object with the patient's identity and personal information; and removing one of the first sheet-like member segments from the second sheet-like member, thereby rendering the indicia printed on the first sheet-like member upper surface illegible.

These and other features and advantages of the invention will be more fully understood from the following description of certain specific embodiments of the invention taken together with the accompanying drawings.

DETAILED DESCRIPTION OF THE INVENTION

Figure 1:
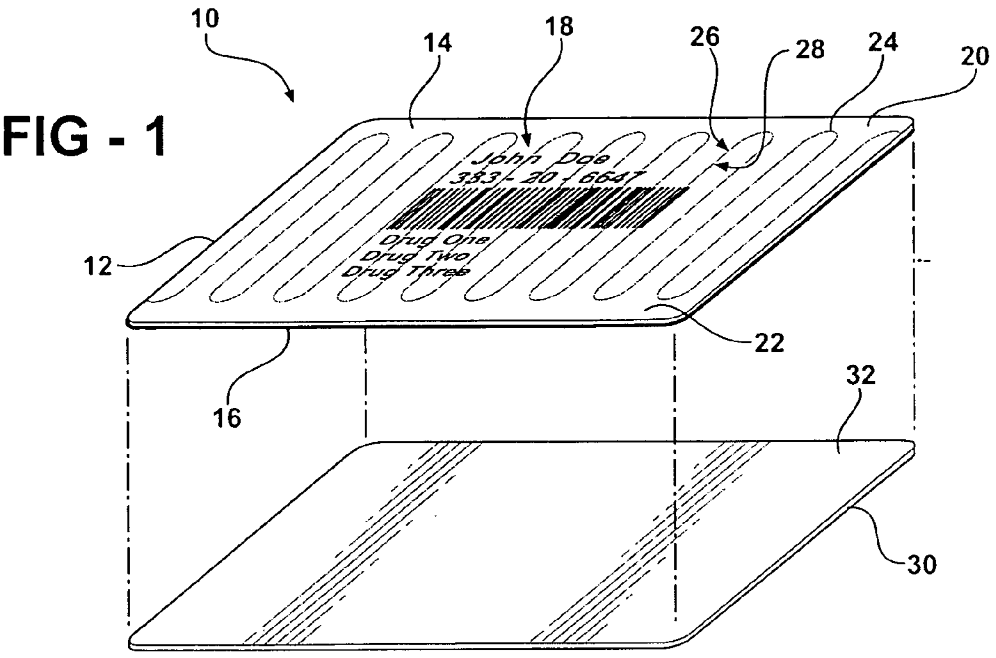
FIG. 1 is an exploded perspective view of a destructible privacy label according to the present invention.

Referring now to the drawings in detail, numeral 10 generally indicates a destructible privacy label for easily destroying patient identity and personal information indicia printed on a surface of the label prior to disposal of a medical object to which the label is attached.

Figure 2:
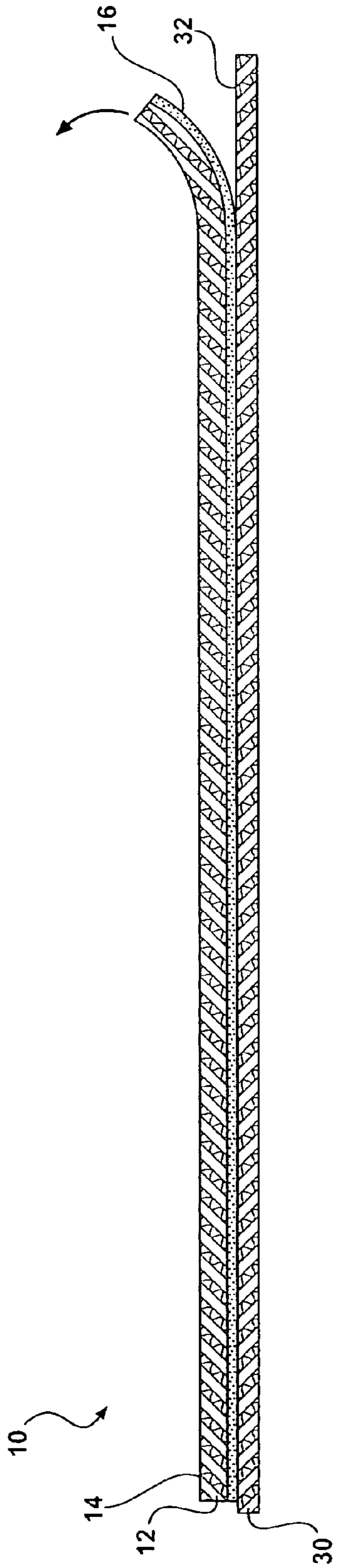
FIG. 2 is a sectional elevational view of the destructible privacy label of FIG. 1.

As illustrated in FIGS. 1 and 2, a destructible privacy label 10 includes a sheet-like member 12 having an upper surface 14 and an adhesive lower surface 16. The upper surface 14 is adapted for printing indicia 18 thereon. Indicia 18 may include a patient name, a patient social security number, a bar code, pharmaceutical drug names, as well as other patient information, words, symbols or alphanumeric text. The indicia 18 preferably may be printed by human or mechanical means. The sheet-like member includes two segments 20, 22 conjoined about a separation line 24 that defines adjacent segment edges 26, 28. The separation line 24 has a curvilinear shape. Each segment 20, 22 is separable from the other along the separation line 24. Removing one of the segments from the other renders indicia 18 printed on the sheet-like member upper surface illegible.

Optionally, the separation line 24 may be a cut line. The separation line 24 may also be sinusoidal and extend from one edge of the sheet-like member to another edge of the sheet-like member. One of the segments 20, 22 of the sheet-like member may have a permanent adhesive on the adhesive lower surface 16. The destructible label 10 may also include a removable release liner 30 contacting the sheet-like member adhesive lower surface 16. The surface 32 of the release liner 30 contacting the sheet-like member adhesive lower surface may be siliconized.

Figure 3:
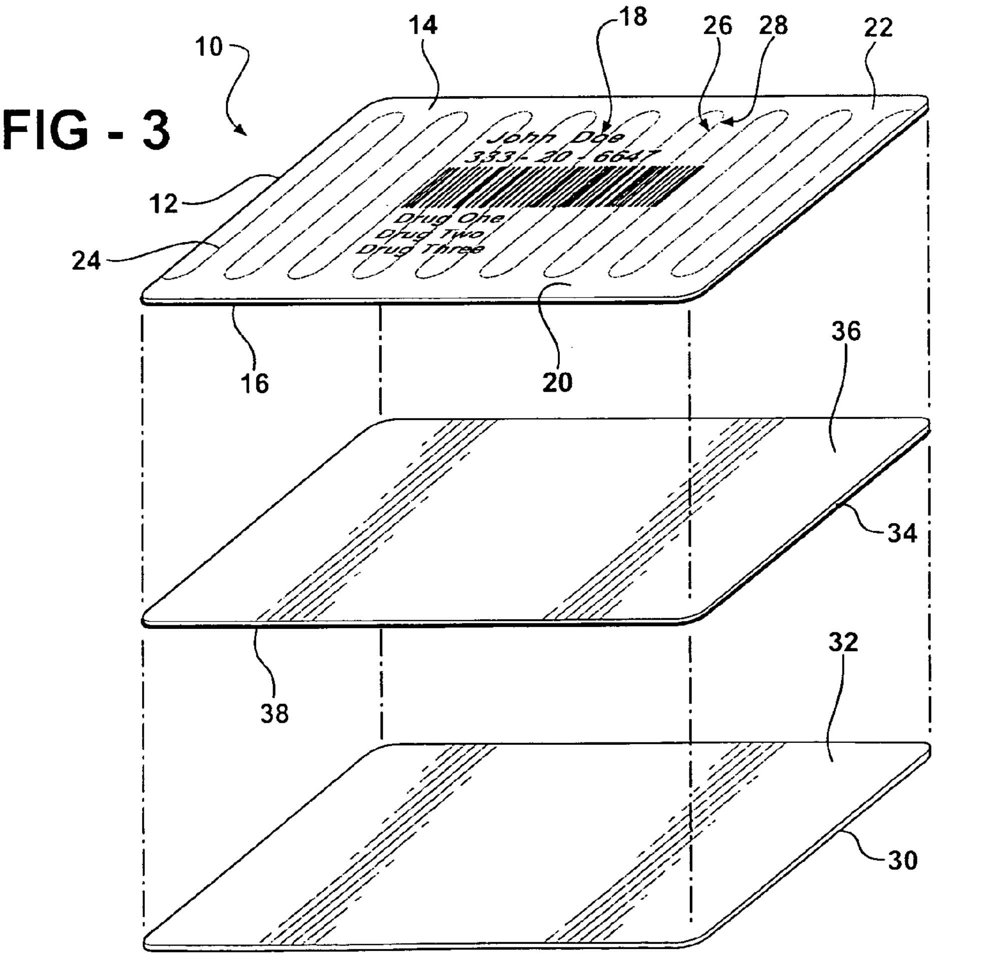
FIG. 3 is an exploded perspective view of an alternative embodiment of a destructible label according to the present invention.
Figure 4:
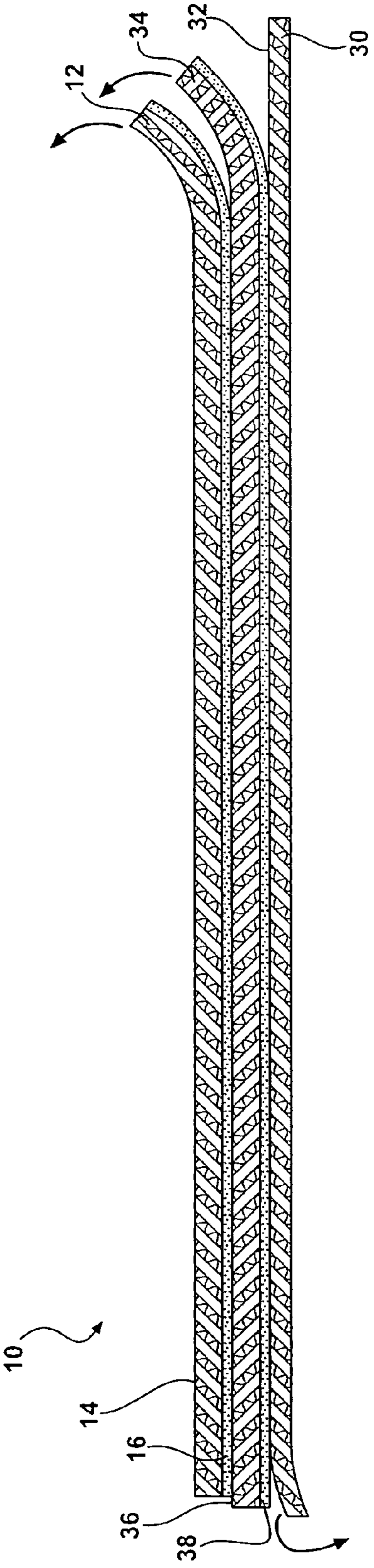
FIG. 4 is a sectional elevational view of the embodiment of FIG. 3.

Referring now to FIGS. 3 and 4, in an alternative embodiment the destructible label 10 may further include a second sheet-like member 34 having an upper surface 36 and an adhesive lower surface 38. The upper surface 36 releasably contacts the first sheet-like member adhesive lower surface 16. The upper surface 36 of the second sheet-like member 34 may be siliconized. The second sheet-like member 34 provides support for the segments 20, 22 of the first sheet-like member 12. A removable release liner 30 may contact the second sheet-like member adhesive lower surface. The surface 32 of the release liner 30 contacting the second sheet-like member adhesive lower surface may be siliconized.

FIGS. 5A through 5G illustrate other alternative embodiments of a destructible privacy label 10. In these embodiments, the destructible privacy label 10 includes a sheet-like member 12 having an upper surface 14 and an adhesive lower surface 16. The upper surface 14 is adapted for printing indicia 18 thereon. The sheet-like member 12 includes a plurality of remainder segments 40 and at least one removable segment 42 that is separable from the remainder segments. Removing the removable segment 42 from the remainder segments 40 renders indicia 18 printed on the sheet-like member upper surface illegible. The remainder segments 40 of the sheet-like member may have a permanent adhesive on the adhesive lower surface 16. The destructible label 10 may further include a second sheet-like member 34 having an upper surface 36 and an adhesive lower surface 38. The second sheet-like member upper surface 36 releasably contacts the first sheet-like member adhesive lower surface 16. A removable release liner 30 may contact the second sheet-like member adhesive lower surface 38.

Figure 5A:
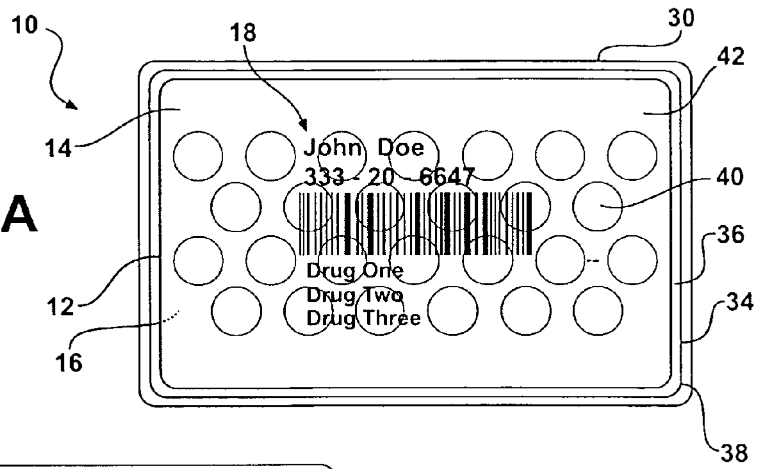
FIG. 5A is plan view of an alternative embodiment of a destructible label according to the present invention.
Figure 5B:
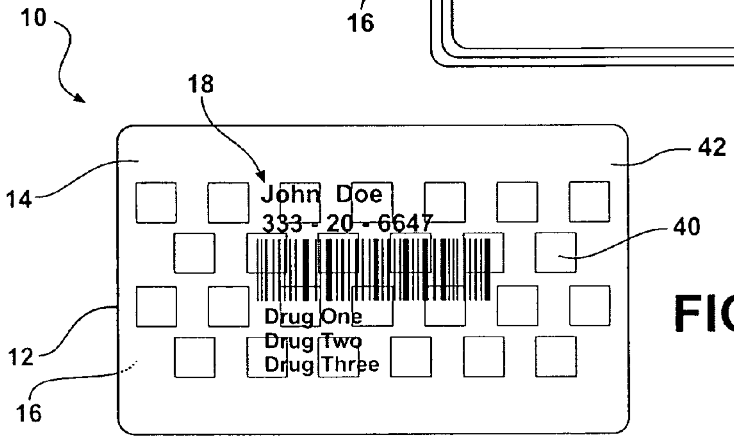
FIG. 5B is plan view of an alternative embodiment of a destructible label according to the present invention.
Figure 5C:
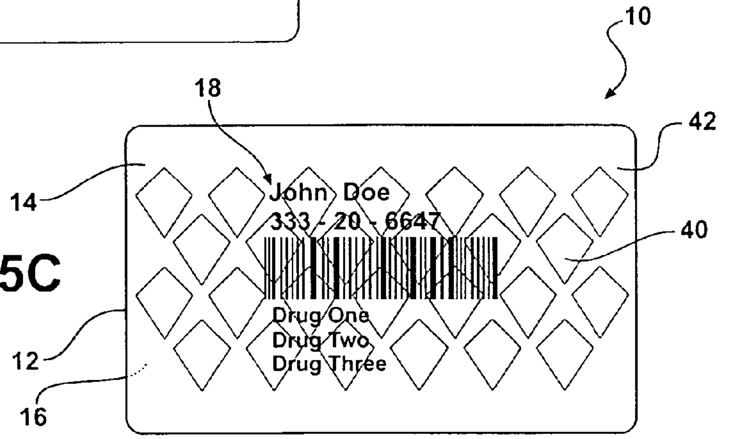
FIG. 5C is plan view of an alternative embodiment of a destructible label according to the present invention.
Figure 5D:
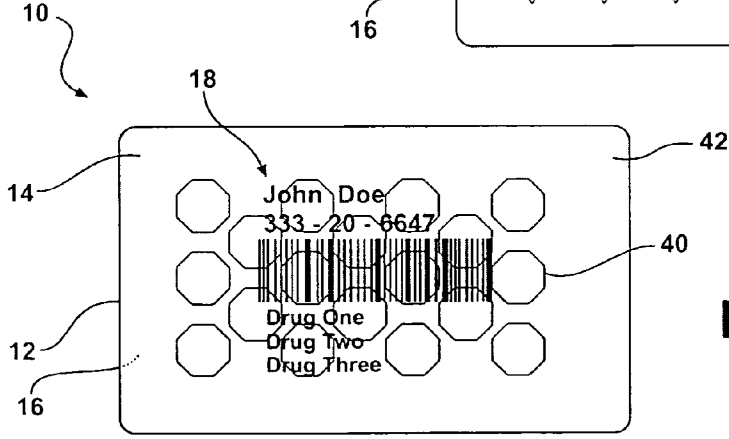
FIG. 5D is plan view of an alternative embodiment of a destructible label according to the present invention.
Figure 5E:
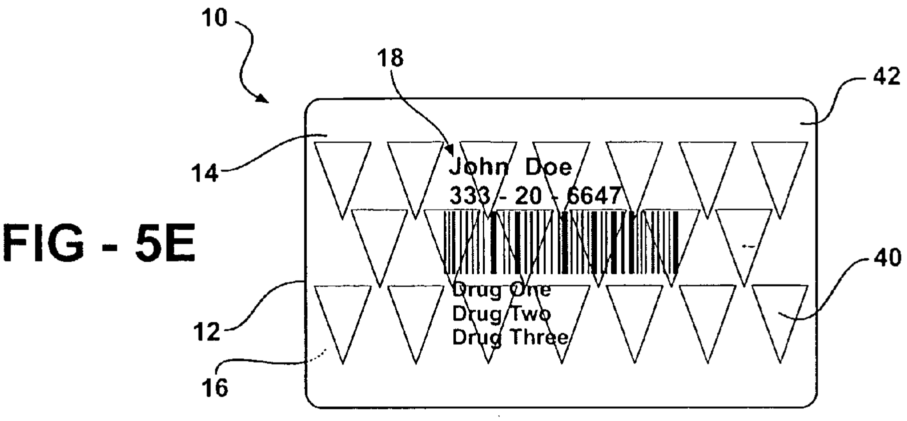
FIG. 5E is plan view of an alternative embodiment of a destructible label according to the present invention.
Figure 5F:
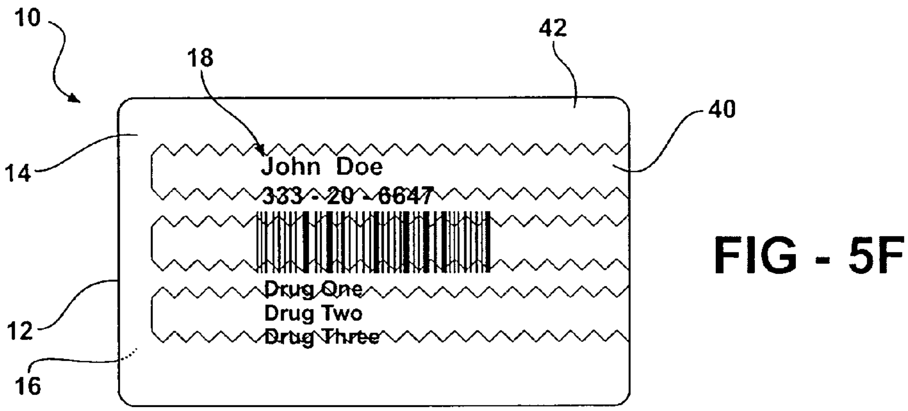
FIG. 5F is plan view of an alternative embodiment of a destructible label according to the present invention.
Figure 5G:
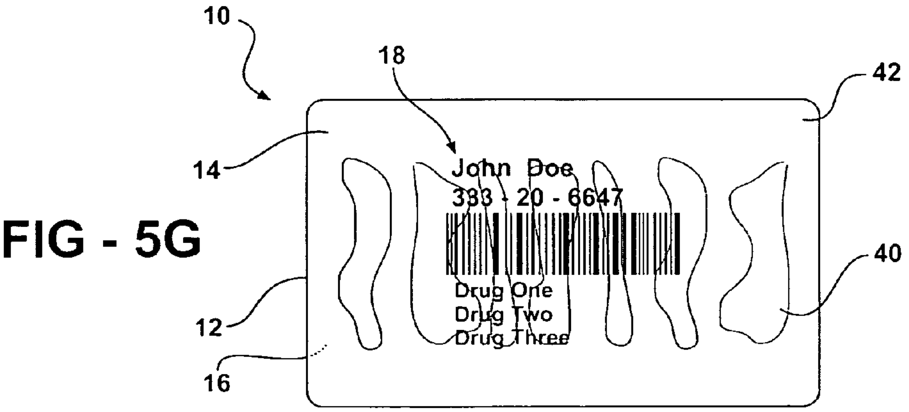
FIG. 5G is plan view of an alternative embodiment of a destructible label according to the present invention.
Figure 6:
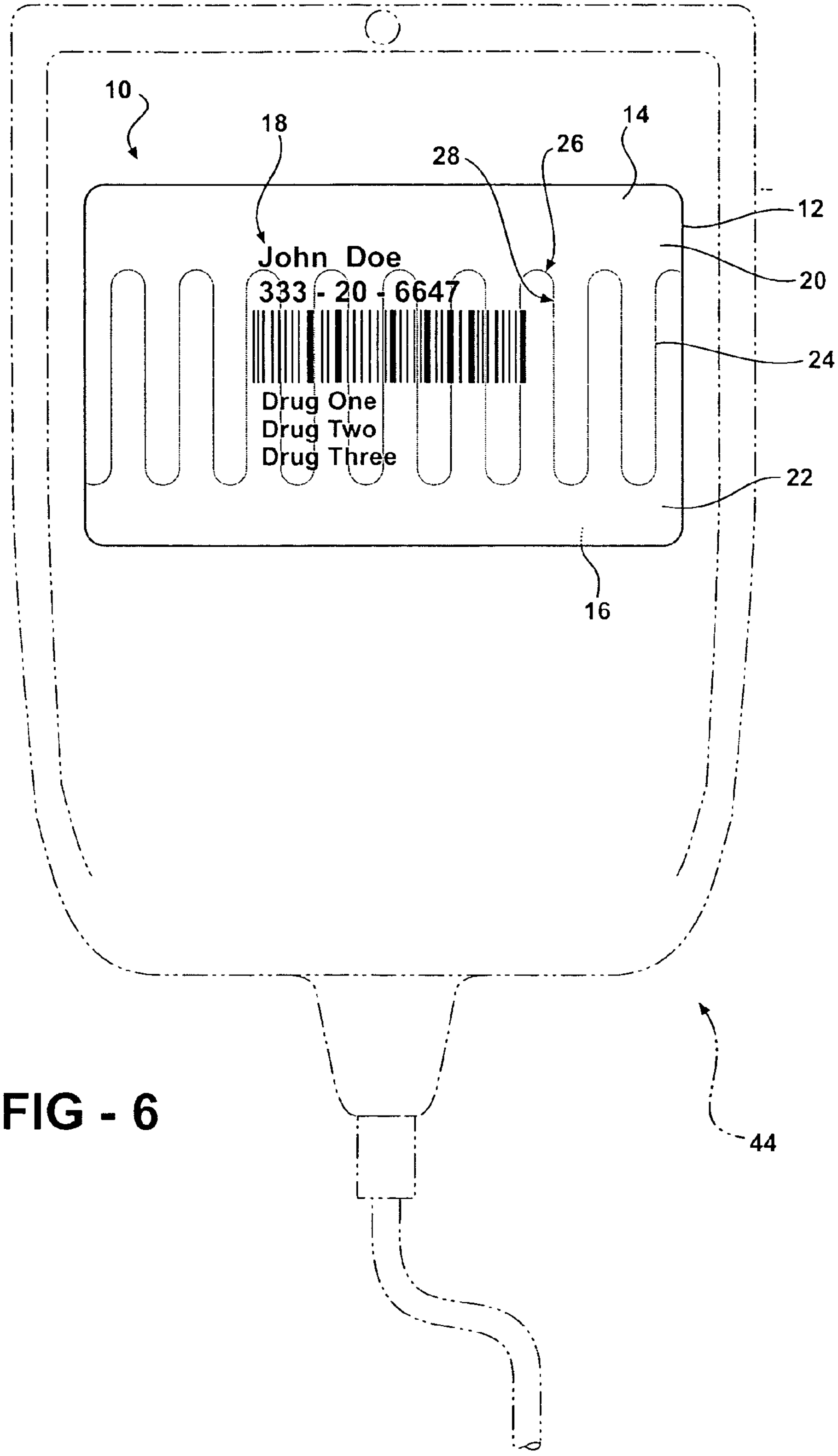
FIG. 6 is an environmental view of a destructible privacy label in accordance with the present invention attached to a medical object.
Figure 7:
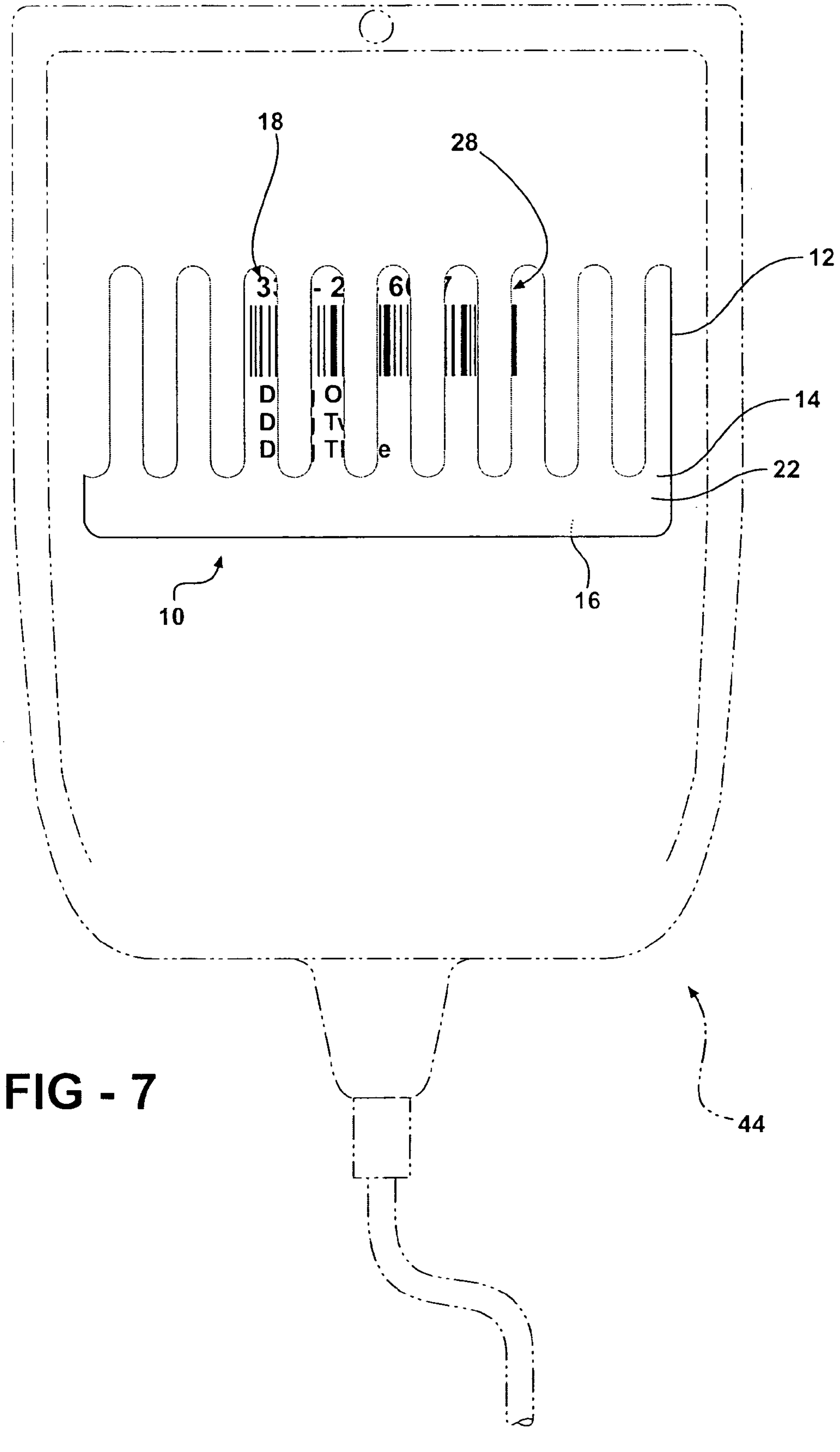
FIG. 7 is the environmental view of the destructible label of FIG. 6 after a segment of the sheet-like member has been removed.

The remainder segments 40 may be of any size two-dimensional geometrical shape such as circles, squares, diamonds, octagons, dagger shapes, saw tooth shapes, and island shapes. It is only necessary that the remainder segments 40 be of such a size, shape, and location relative to each other that removal of the removable segment 42 causes indicia 18 printed on the sheet-like member upper surface 14 incomplete and therefore, illegible. FIG. 5A depicts remainder segments 40 that are circles. FIG. 5B depicts remainder segments 40 that are squares. FIG. 5C depicts remainder segments 40 that are diamonds. FIG. 5D depicts remainder segments 40 that are octagons. FIG. 5E depicts remainder segments 40 that are dagger shapes. FIG. 5F depicts remainder segments 40 that are saw tooth shapes. FIG. 5G depicts remainder segments 40 that are island shapes.

Referring now to FIGS. 1 through 4 and FIGS. 6 and 7, indicia 18 may be printed on the upper surface 14 of the sheet-like member 12. The removable release liner 30, if present, may then be removed from the sheet-like member adhesive lower surface 16. The adhesive lower surface 16 may then be placed on an object 44 such as a medical IV bag, a medical record sheet, a medical container, a medical instrument, a medical device, or other similarly related object. Placing the destructible label 10 on the object 44 associates the object with a patient's identity and personal information represented by the indicia 18 on the sheet-like member upper surface 14. At such time that the association between the indicia 18 and the object 44 is no longer needed, or prior to disposal of the object 44, or after the elapsing of any other period of time, one of the segments 20 may be removed from the other segment 22 and from the object 44. Removing the segment 20 thereby renders the indicia 18 printed on the sheet-like member upper surface 14 illegible. This effectively protects the privacy of the patient's identity and personal information represented by the indicia 18.

If the destructible label 10 includes a second sheet-like member 34, then after indicia 18 is printed on the first sheet-like member upper surface 14, the adhesive lower surface 38 of the second sheet-like member 34 is placed on an object 44. Further, if a removable release liner 30 is contacting the second sheet-member adhesive lower surface 38, then the release liner 30 must be removed from the second sheet-like member 34 prior to placing the destructible label 10 on the object 44. Removing one of the first sheet-like member segments 20 from the other segment 22 and from the second sheet-like member 34 renders the indicia 18 printed on the first sheet-like member upper surface 14 illegible.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A destructible privacy label comprising:

a first sheet-like member having an upper surface and an adhesive lower surface;

said upper surface adapted for printing indicia thereon;

said first sheet-like member comprising a single layer including two segments conjoined about a separation line that defines adjacent segment edges;

said two segments together define the printed indicia area;

each segment being separable from the other along the separation line;

one segment of said first sheet-like member has a permanent adhesive on said adhesive lower surface and the other segment is removable;

said separation line extending from one edge of said first sheet-like member to another edge of said first sheet-like member; and a second sheet-like member having an upper surface and an adhesive lower surface, said upper surface is siliconized and releasably directly contacting said first sheet-like member adhesive lower surface;

wherein removing one of said segments from the other renders said indicia printed on said first sheet-like member upper surface illegible of said destructible privacy label.

2. The destructible privacy label of claim 1, wherein said separation line is sinusoidal.

3. The destructible privacy label of claim 1, wherein said separation line is a cut line.

4. The destructible privacy label of claim 1, further comprising:

a removable release liner contacting said second sheet-like member adhesive lower surface.

5. The destructible privacy label of claim 4, wherein the surface of said release liner contacting said second sheet-like member adhesive lower surface is siliconized.

6. A destructible privacy label comprising:

a first sheet-like member including a single layer having an upper surface and an adhesive lower surface;

said upper surface adapted for printing indicia thereon;

said first sheet-like member comprising a plurality of remainder segments; said plurality of segments together define the printed indicia area;

said first sheet-like member further comprising at least one removable segment that is separable from said remainder segments at least one remainder segment of said first sheet-like member has a permanent adhesive on said adhesive lower surface; and a second sheet-like member having an upper surface and an adhesive lower surface, said upper surface is siliconized and releasably directly contacting said first sheet-like member adhesive lower surface;

wherein removing said removable segment from said remainder segments renders said indicia printed on said first sheet-like member upper surface illegible of said destructible privacy label.

7. The destructible privacy label of claim 6, wherein at least one of said remainder segments has a two-dimensional shape chosen from a group of circles, squares, diamonds, octagons, dagger shapes, saw tooth shapes, and island shapes.

8. The destructible privacy label of claim 6, further comprising:

a removable release liner contacting said second sheet-like member adhesive lower surface.

* * * * *